US012033456B2

(12) United States Patent
Azbill et al.

(10) Patent No.: US 12,033,456 B2
(45) Date of Patent: *Jul. 9, 2024

(54) SYSTEMS AND METHODS FOR DISPLAYING ONE OR MORE RANDOMLY TRAVERSING SELECTION INDICIA DURING AN ELECTRONIC GAME

(71) Applicant: Aristocrat Technologies, Inc., Las Vegas, NV (US)

(72) Inventors: Katie Azbill, Cedar Park, TX (US); Zachary Smith, Austin, TX (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/336,619

(22) Filed: Jun. 16, 2023

(65) Prior Publication Data

US 2023/0326288 A1 Oct. 12, 2023

Related U.S. Application Data

(63) Continuation of application No. 18/066,125, filed on Dec. 14, 2022, now Pat. No. 11,721,161, which is a continuation of application No. 17/341,750, filed on Jun. 8, 2021, now Pat. No. 11,557,168.

(60) Provisional application No. 63/071,955, filed on Aug. 28, 2020.

(51) Int. Cl.
*G07F 17/32* (2006.01)

(52) U.S. Cl.
CPC ................................ *G07F 17/3211* (2013.01)

(58) Field of Classification Search
None
See application file for complete search history.

(56) References Cited

U.S. PATENT DOCUMENTS

| | | | |
|---|---|---|---|
| 5,833,537 | A | 11/1998 | Barrie |
| 6,095,921 | A | 8/2000 | Walker |
| 6,146,273 | A | 11/2000 | Olsen |
| 6,905,407 | B2 | 6/2005 | Nordman |
| 7,753,778 | B2 | 7/2010 | Kato |

(Continued)

OTHER PUBLICATIONS

Office Action (Non-Final Rejection) dated Mar. 23, 2022 for U.S. Appl. No. 17/341,750 (pp. 1-15).

(Continued)

*Primary Examiner* — Robert T Clarke, Jr.
(74) *Attorney, Agent, or Firm* — Armstong Teasdale LLP

(57) ABSTRACT

An electronic gaming machine includes a processor configured to control a display to display a matrix of award symbol display positions, at least some of the award symbol display positions including an award symbol. The processor is also configured to control the display to display at least one selection indicium within the matrix, determine a starting award symbol display position and an ending award symbol display position within the matrix, randomly determine a path between the starting award symbol display position and the ending award symbol display position, control the display to display the at least one selection indicium traversing the randomly determined path between the starting award symbol display position and the ending award symbol display position, and provide an award associated with the ending award symbol display position.

20 Claims, 13 Drawing Sheets

(56) References Cited

U.S. PATENT DOCUMENTS

| | | | |
|---|---|---|---|
| 8,342,945 B2 | 1/2013 | Gomez | |
| 9,972,171 B2 | 5/2018 | Marston | |
| 10,102,711 B2 | 10/2018 | Zoltewicz | |
| 10,607,439 B2 | 3/2020 | Caputo | |
| 10,769,882 B2 | 9/2020 | Uss | |
| 10,796,528 B2 | 10/2020 | Bridges | |
| 11,551,527 B2 | 1/2023 | Cohn | |
| 2004/0077395 A1 | 4/2004 | Tuhy | |
| 2004/0102238 A1 | 5/2004 | Taylor | |
| 2004/0127282 A1 | 7/2004 | Naobayashi | |
| 2004/0229700 A1 | 11/2004 | Cannon | |
| 2006/0025203 A1 | 2/2006 | Thomas | |
| 2008/0153577 A1 | 6/2008 | Seelig | |
| 2008/0311973 A1 | 12/2008 | Jaffe | |
| 2011/0111826 A1 | 5/2011 | Baerlocher | |
| 2012/0108324 A1 | 5/2012 | King | |
| 2014/0287812 A1 | 9/2014 | Friedman | |
| 2018/0204422 A1 | 7/2018 | Berman | |
| 2018/0293847 A1* | 10/2018 | Hendricks | G07F 17/3213 |
| 2019/0311571 A1 | 10/2019 | Halvorson | |
| 2020/0074784 A1 | 3/2020 | Caputo | |
| 2020/0294367 A1 | 9/2020 | Crispino | |
| 2020/0364974 A1 | 11/2020 | Marks | |

OTHER PUBLICATIONS

Office Action dated May 27, 2022 for U.S. Appl. No. 17/449,633 (pp. 1-11).
Office Action (Notice of Allowance and Fees Due (PTOL-85)) dated Sep. 23, 2022 for U.S. Appl. No. 17/341,750 (pp. 1-7).
Office Action dated Oct. 6, 2022 for U.S. Appl. No. 17/449,633 (pp. 1-21).
Office Action (Notice of Allowance and Fees Due (PTOL-85)) dated Oct. 6, 2022 for U.S. Appl. No. 17/341,750 (pp. 1-4).
Notice of Allowance dated Apr. 4, 2023 for U.S. Appl. No. 18/066,125 (pp. 1-8).
Office Action (Notice of Allowance and Fees Due (PTOL-85)) dated Jun. 14, 2023 for U.S. Appl. No. 17/449,633 (pp. 1-19).
Office Action (Notice of Allowance and Fees Due (PTOL-85)) dated Aug. 29, 2023 for U.S. Appl. No. 17/449,633 (pp. 1-2).
Office Action (Notice of Allowance and Fees Due (PTOL-85)) dated Oct. 12, 2023 for U.S. Appl. No. 17/449,633 (pp. 1-2).

* cited by examiner

SYSTEMS AND METHODS FOR DISPLAYING ONE OR MORE RANDOMLY TRAVERSING SELECTION INDICIA DURING AN ELECTRONIC GAME

CROSS REFERENCE TO RELATED APPLICATIONS

This application is a continuation of and claims priority to U.S. patent application Ser. No. 18/066,125, filed Jun. 8, 2021, which is a continuation of U.S. patent application Ser. No. 17/341,750, now U.S. Pat. No. 11,557,168, filed Jun. 8, 2021, which claims priority to U.S. Provisional Patent Application No. 63/071,955, filed Aug. 28, 2020, which are hereby incorporated by reference herein in their entireties.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

SUMMARY

In one aspect, a system for electronic gaming is described. The system includes a display device, a memory device, and a processor configured to execute instructions stored on the memory device, which when executed, cause the processor to at least control the display device to display a matrix of award symbol display positions including a plurality of rows and a plurality of columns, at least some of the award symbol display positions including an award symbol associated with an award. The instructions also cause the processor to control the display device to display at least one selection indicium within the matrix, determine a starting award symbol display position and an ending award symbol display position within the matrix, randomly determine a path between the starting award symbol display position and the ending award symbol display position, control the display device to display the at least one selection indicium traversing the randomly determined path between the starting award symbol display position and the ending award symbol display position, and in response to the at least one selection indicium stopping on the ending award symbol display position, provide the award associated with the ending award symbol display position to a player.

In another aspect, a non-transitory, tangible, computer-readable storage medium is described. The computer-readable storage medium includes computer-executable instructions stored thereon, which when executed by a processor, cause the processor to at least control a display device to display a matrix of award symbol display positions including a plurality of rows and a plurality of columns, at least some of the award symbol display positions including an award symbol associated with an award. The instructions also cause the processor to control the display device to display at least one selection indicium within the matrix, determine a starting award symbol display position and an ending award symbol display position within the matrix, wherein the selection indicium is superimposed on the matrix and at least partially transparent, such that at least a portion of the matrix is visible through the at least one selection indicium. The instructions also cause the processor to randomly determine a path between the starting award symbol display position and the ending award symbol display position, control the display device to display the at least one selection indicium traversing the randomly determined path, and in response to the at least one selection indicium stopping on a preselected ending award symbol display position within the matrix, provide the award associated with the ending award symbol display position to a player.

In yet another aspect, a method for electronic gaming is described. The method includes controlling a display device of a mobile gaming system to display a matrix of award symbol display positions, at least some of the award symbol display positions including an award symbol, and controlling the display device to display at least one selection indicium within the matrix. The method also includes randomly determining a path between at least some of the award symbol display positions within the matrix, controlling the display device to display the at least one selection indicium traversing the randomly determined path, in response to the at least one selection indicium stopping on a preselected ending award symbol display position, providing, by the processor, the award associated with the ending award symbol display position to a player.

DETAILED DESCRIPTION

Figure 1:
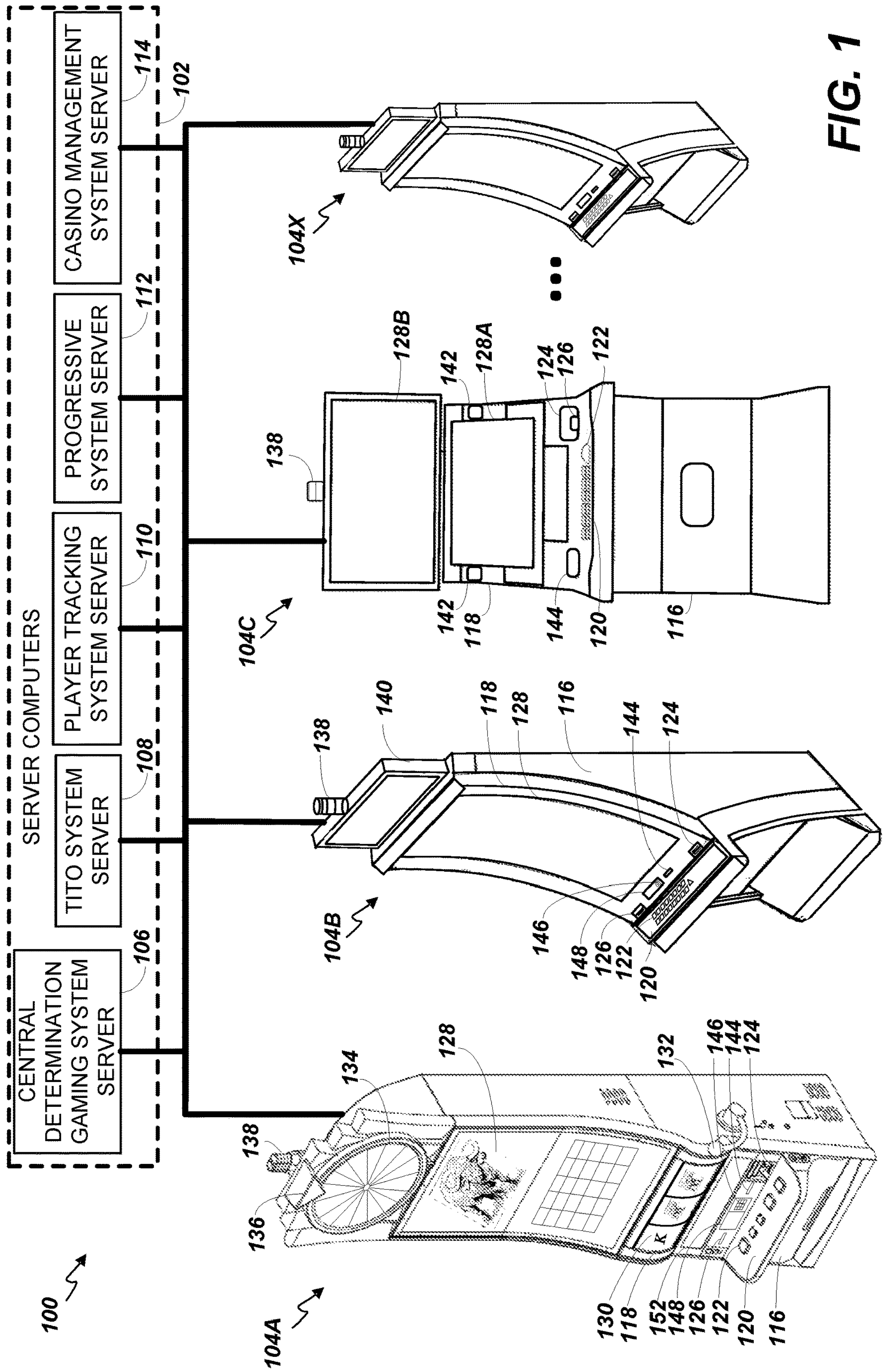
FIG. 1 is an exemplary diagram showing several EGMs networked with various gaming related servers.

Systems and methods for electronic gaming are described, in which a matrix of award symbol display positions is displayed, and in which at least some of the award symbol display positions include an award symbol or prize. In various embodiments, the matrix of award symbol display positions may be provided as a substitute for a larger-size game element, such as a wheel and/or another game element that may typically be displayed by a full-size electronic gaming machine. For example, the matrix of award symbol display positions described herein may in at least one implementation be provided to a mobile computing device, such as a smartphone or tablet computing device, which may include a smaller display than, for example, a full-size electronic gaming machine. The matrix may be more legible and/or include an easier to read visual presentation than a standard wheel, which may be divided into many sectors or segments and which may, when displayed compactly on a relatively small display of a mobile computing device, be difficult to read and/or otherwise suffer in terms of overall aesthetic and presentation. Stated another way, at least one technical problem addressed by the present disclosure is that of providing an alternate version of a game, or feature game, when the game is to be played on a device having a smaller display and/or when displaying the full- or standard-size version of the game would impair the legibility and/or visual aesthetic of the game on a smaller display device.

Accordingly, in at least some embodiments, and as described in additional detail herein, to solve at least the foregoing technical problem, the matrix of award symbol display positions may correspond to (or function as a substitute for) a wheel, such as a feature game wheel that may be displayed by a full-size electronic gaming machine. Whereas the wheel may be divided into a plurality of sectors or segments (e.g., "pie-shaped" segments) in a full-size version, in a mobile version of the feature game, the wheel may be replaced by the matrix of symbol award symbol display positions, where each award symbol display position may correspond to a respective sector of the full-size wheel. As a result, in the wheel-version of the feature game, what a player wins may be specified by a wheel sector (e.g., in relation to a pointer located adjacent the wheel), in the mobile version, the award provided to a player may appear in a given award symbol display position, where the given award symbol display position thus corresponds to a sector of the wheel that would otherwise be selected to provide the same or a similar award.

This aspect of the present disclosure not only improves readability dramatically in a mobile embodiment of the feature game, but also provides a game designer each wheel sector in the form of an award symbol display position in a matrix, thereby allowing the game designer to provide a better, uncompromised, mobile version of a game element that is, in at least some cases, displayed in the form of a wheel on standard-size games presented by full- or standard size electronic gaming machines. Moreover, although in some embodiments, the matrix of award symbol display positions is described as being provided only in a feature game, in other embodiments, the matrix of award symbol display positions may also be provided in a standard- or full-size version of the game displayed on an electronic gaming machine. Likewise, in some embodiments, a wheel version of the feature game may be displayed on a mobile computing device.

In various embodiments, to select between a wheel-version and a matrix-version of the feature game, as described herein, a server system, such as a casino management system server, may initially determine whether the feature game is to be provided to or displayed by an electronic gaming machine or a mobile computing device. In the former case, the server may configure a wheel-version of the game for display. In the latter instance, the server may configure a matrix-version of the feature game. Accordingly, a server system may, in some embodiments, provide different versions of a game and/or a feature game thereof to support a best or most visually appealing version of the game and/or feature game given the display size and/or other display constraints of the device on which the game is to be played.

During gameplay, such as in a matrix-version of the feature game described herein, at least one selection indicium may be displayed within the matrix. Specifically, at least one selection indicium, such as an indicium resembling a reticle, a frame, a spyglass, and the like may be displayed to randomly traverse the matrix. In various embodiments, the selection indicium may correspond to a pointer in a wheel-version of the game, inasmuch as when the wheel stops, the pointer may indicate a particular segment, whereas in the matrix-version, the selection indicium moves (as opposed to the pointer) and the matrix of award symbol display positions (corresponding to the wheel segments) remains static. As a result, and stated another way, the element that moves (wheel or selection indicium) is flip-flopped relative to the element that remains static (pointer or matrix) in the alternate versions of the game.

Moreover, in various embodiments, and in the matrix-version of the game, when the selection indicium stops, or "lands," on an award symbol display position within the matrix, the award or prize associated therewith may be provided to the player. To display the randomly traversing selection indicium, a starting award symbol display position and an ending award symbol display position may be determined within the matrix. Likewise, a randomly determined path may be plotted or calculated between the starting award symbol display position and the ending award symbol display position, and the selection indicium may travel or traverse, within the matrix, the randomly determined path between the starting award symbol display position and the ending award symbol display position. When the selection indicium stops or lands on the ending award symbol display position, the award or prize associated therewith may be provided to the player.

In at least some embodiments, and as described herein, technical improvements and effects associated with the present disclosure include, but are not limited to: i) displaying a selection indicium that traverses a randomly determined path between a starting position and an ending position within a matrix of award display positions; ii) determining the starting position of the selection indicium; iii) determining the ending position of the selection indicium; iv) causing the selection indicium to traverse, or travel, along a randomly determined path between the starting position and the ending position; v) calculating the path between the starting position and the ending position in segments or sections to alleviate processing and memory requirements as well as to improve processing speed; vi) increasing a speed of the selection indicium during traversal of the path to increase player anticipation and excitement; vii) display a plurality of selection indicia, each of which randomly traverses a respective path, within the matrix of award display positions; viii) allowing one or more selection indicia to persist across multiple rounds of gameplay to increase a sense of player equity or investment as well as to increase excitement as gameplay progresses through multiple rounds; ix) providing a feature game, including a matrix and selection indicium, that is more easily visible by a player on a small display device screen, such as a display of a mobile device (e.g., a smartphone or tablet computing device); x) providing alternate versions of the feature game, including a matrix-version and a wheel-version; xi) providing the matrix-version of the game when the game is to be played on a device having a display that is smaller than or different from an electronic gaming machine display, such as a mobile computing device or smartphone; and xii) providing the wheel-version of the game when the game is to be played on an electronic gaming machine.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementations, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
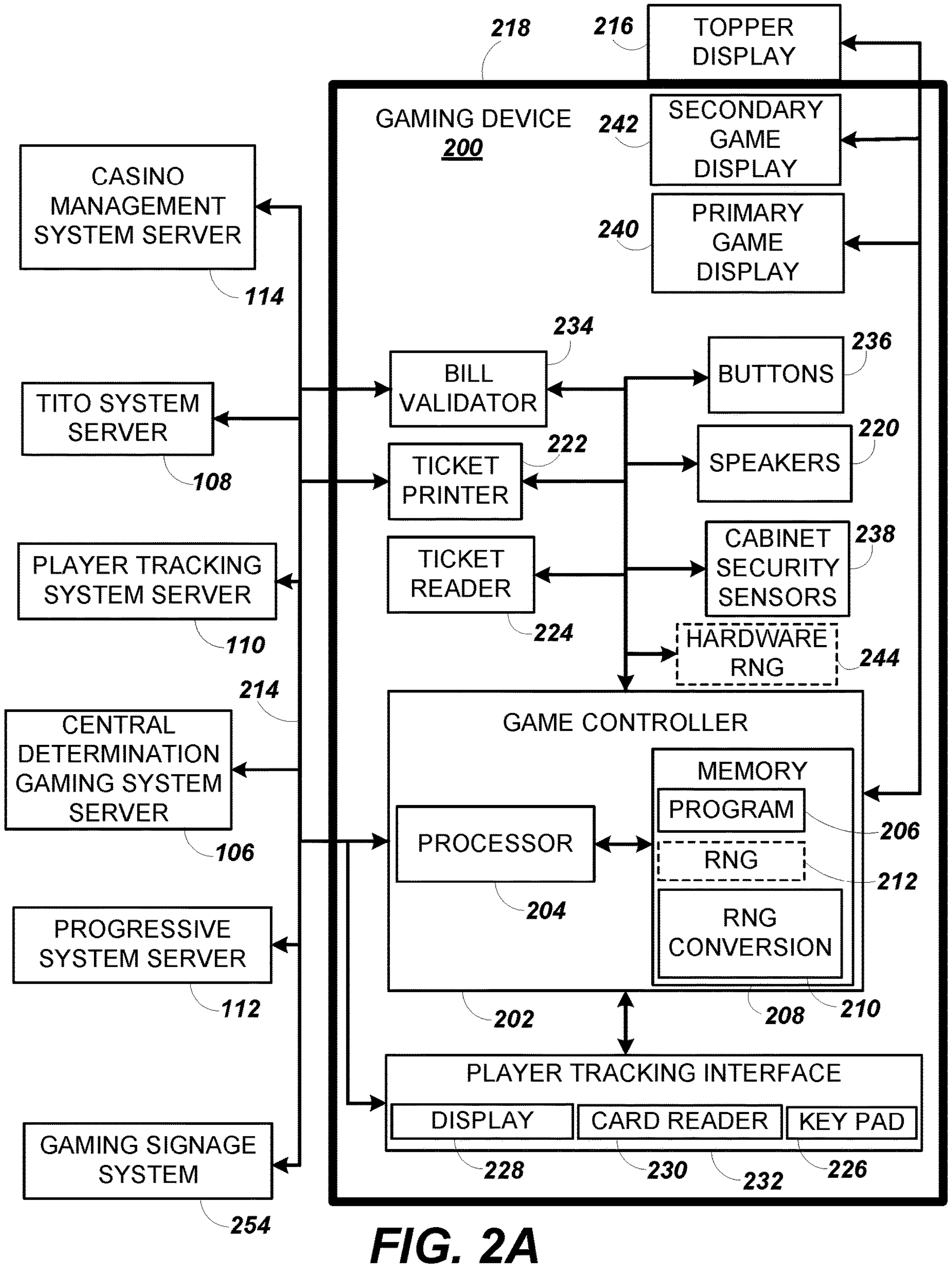
FIG. 2A is a block diagram showing various functional elements of an exemplary EGM.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random-access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
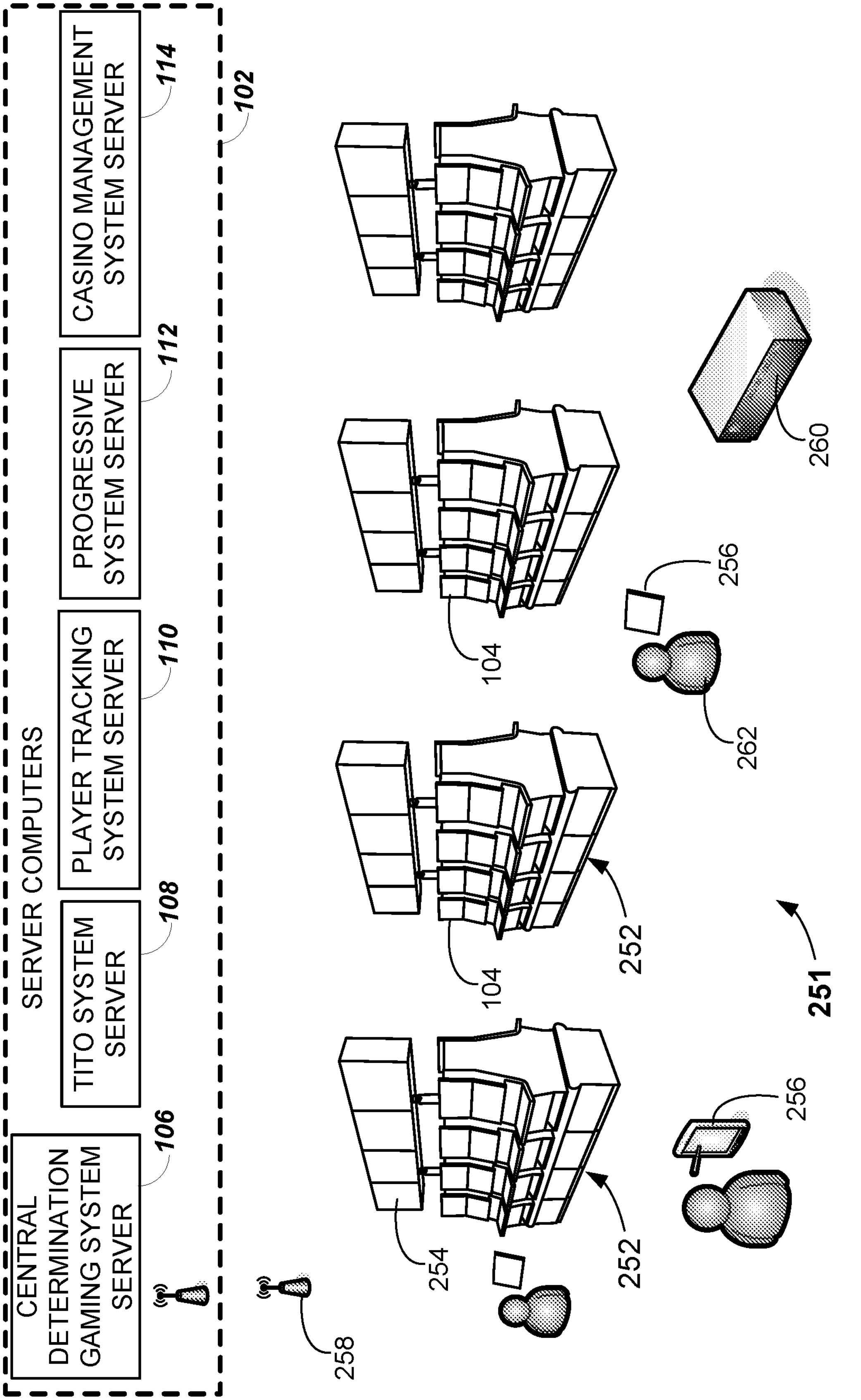
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
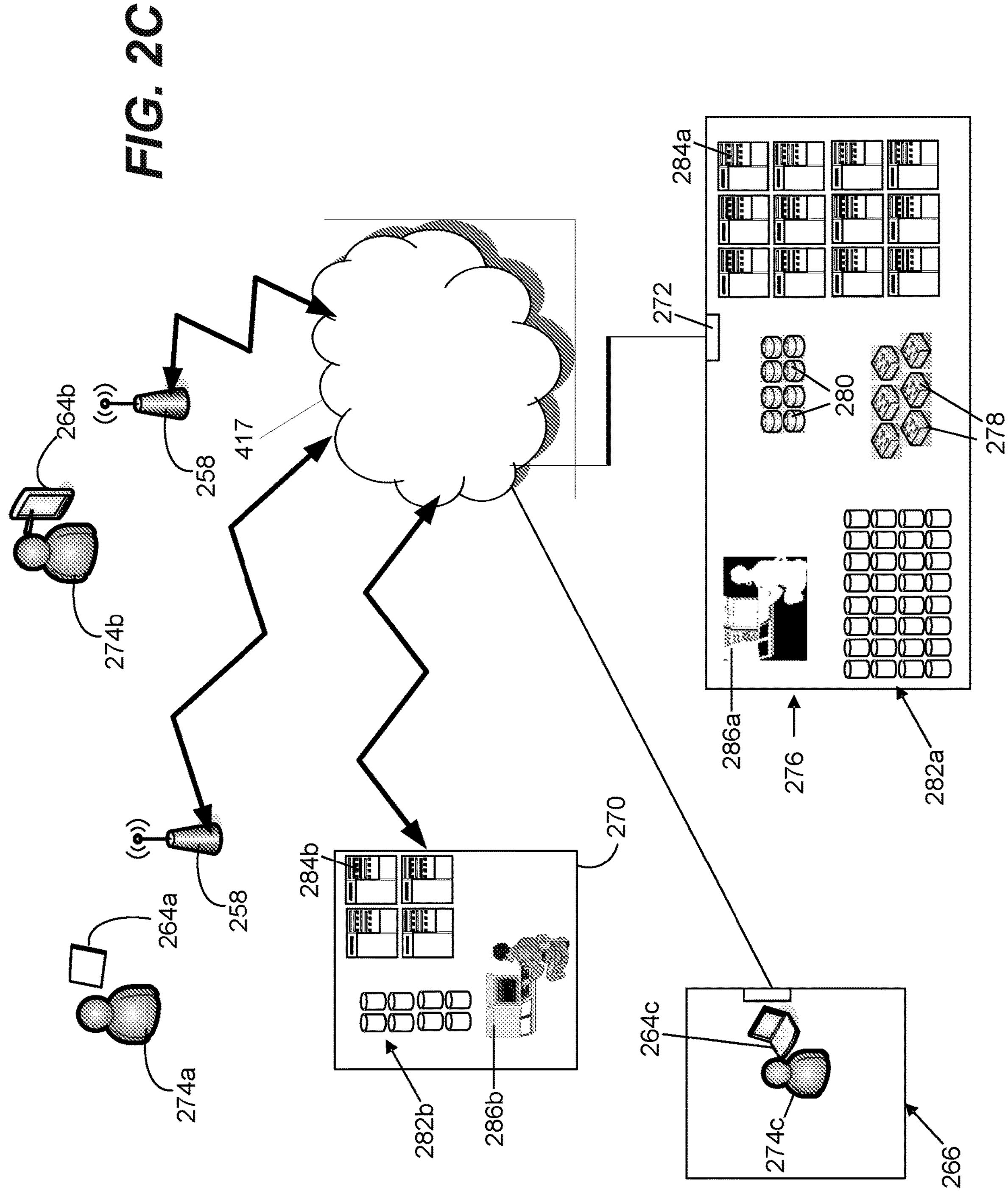
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 570*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server(s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
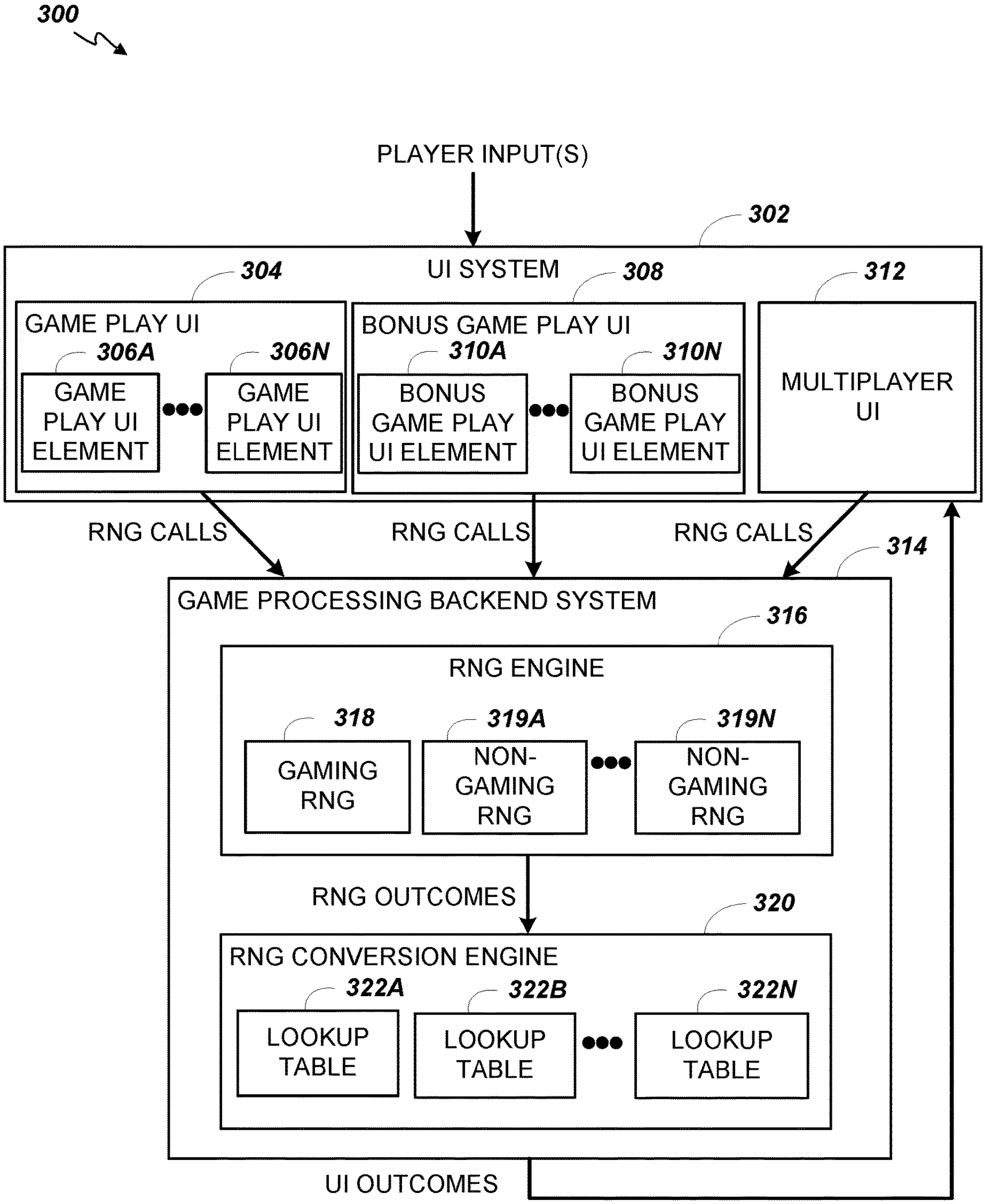
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

Figure 4:
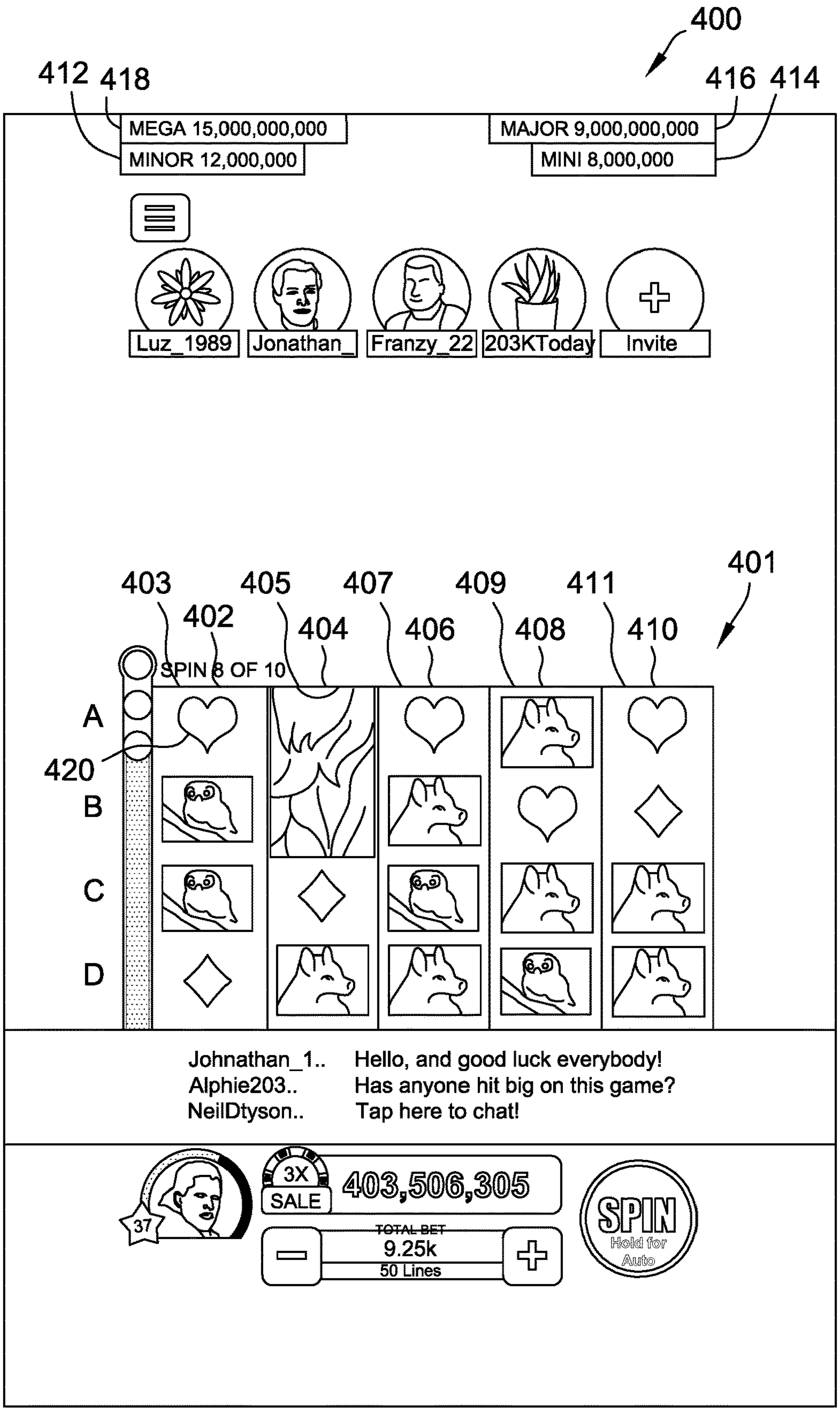
FIG. 4 is an example embodiment of a display area displayed during a base game in accordance with the present disclosure, in which a plurality of symbols are displayed and in which a feature game is not yet triggered.

FIG. 4 is an example embodiment of a display area 400 that may be displayed during a base game played on an EGM and/or a mobile computing device, such as a smartphone or tablet computing device. Display area 400 includes a plurality of columns 402-410 and a plurality of rows, labeled "A," "B," "C," and "D." Together, columns 402-410 and rows A-D may define a matrix 401 of symbol display positions which may, as described herein, include different symbols. In some embodiments, columns 402-410 may include reels 403-411, which may be spun and stopped to display a plurality of symbols within matrix 401. For example, during play of the base game, each of the reels 403-411 may be spun and stopped in each column 402-410, respectively, such that when the reels 403-411 are stopped, a plurality of symbols are displayed within the symbol display positions defined by matrix 401. For example, a first symbol 420 may occupy a first symbol display position at column 402, row "A." Although four rows "A-D" and five columns 402-410 are shown, it will be appreciated that any number of rows and columns may be implemented to define a matrix 401 of any desired size, having any suitable number of symbol display positions.

Figure 5:
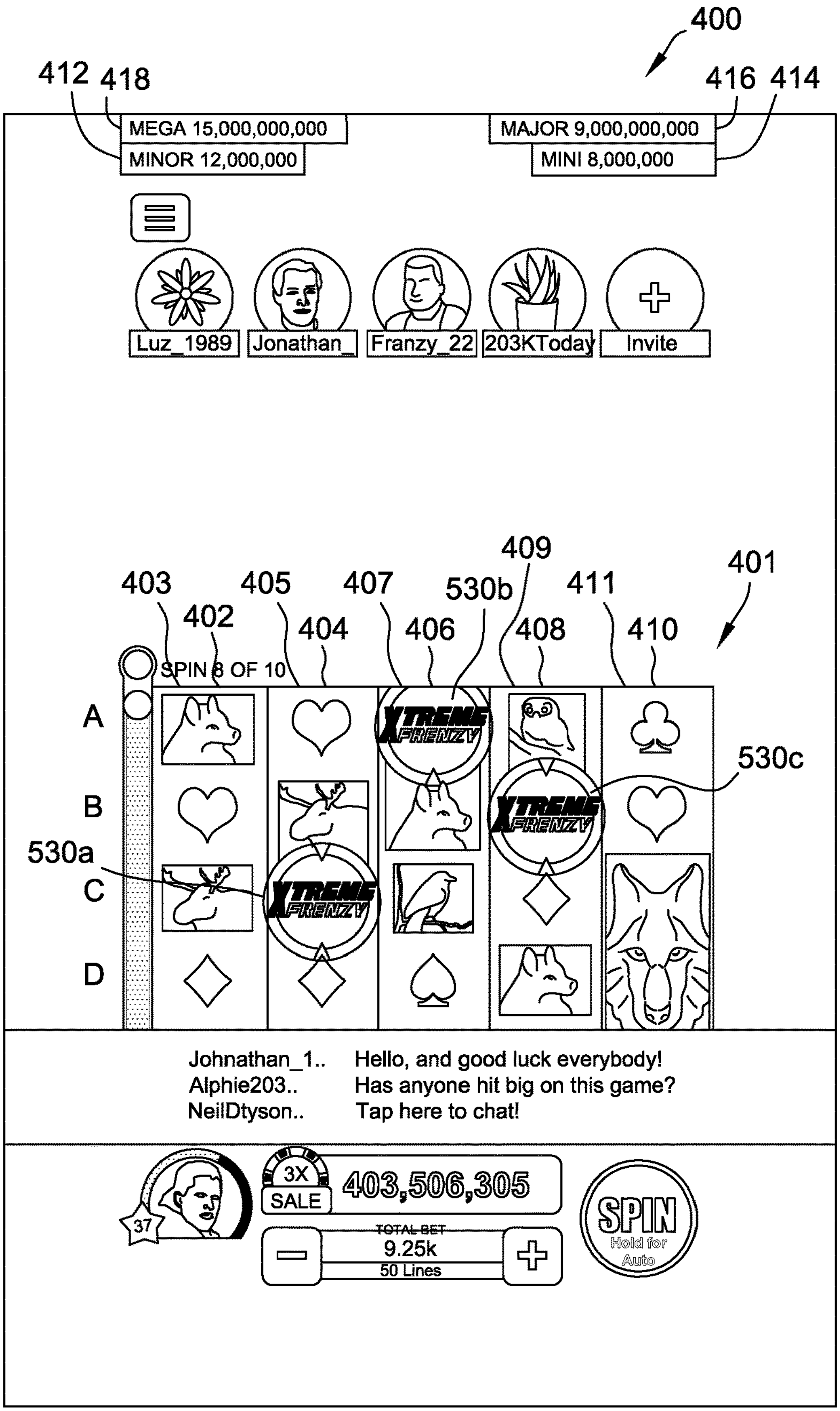
FIG. 5 is an example embodiment of a display area displayed during a base game in accordance with the present disclosure, in which a plurality of symbols are displayed and in which a feature game is triggered.

FIG. 5 is an example embodiment of display area 400 displayed during the base game after a reel spin of reels 403-411 has been completed. In an example implementation, the outcome of the reel spin comprises selection of three feature game trigger symbols 530*a-c* as well as a plurality of other symbols, each displayed in a respective symbol display position of matrix 401. As used herein, selection of a symbol for display in a symbol display position may be referred to as "landing" of the symbol, where a symbol may "land" in a respective symbol display position when reels 403-411 are stopped. As shown, trigger symbols 530*a-c* may include a designation, such as "Xtreme Frenzy," and/or any other suitable artwork and/or designation to indicate that symbols 530*a-c* are associated with a feature game, as described herein.

Accordingly, in the example embodiment, if three or more trigger symbols 530*a-c* land within matrix 401 during the base game, a feature game may be triggered or initiated, during which the player may be provided one or more awards in association with a randomly traversing indicium and/or a plurality of randomly traversing indicia, as described in additional detail herein. In at least some embodiments, the feature game may be referred to as an Xtreme Frenzy feature game, although any other designation, feature game name, and/or artwork may be provided, as desired.

In some embodiments, the feature game may include a plurality of rounds of play. For example, in at least one embodiment, the feature game, as described herein, may include three rounds of play. During each round of play, one or more selection indicia 630 (FIG. 6) may be displayed. Specifically, as described, one or more selection indicia 630 may randomly traverse a feature game matrix 610 to indication selection of one or more awards or prizes.

In some embodiments, a round of play may conclude with selection of at least one award from matrix 610, and a next round of play may begin following conclusion of the previous round, until the plurality of rounds are each concluded. After the feature game concludes, gameplay may return to the base game. Moreover, although in the example implementation, three rounds of play are provided, it will be appreciated that any suitable number of rounds of play may be provided to a player. In addition, in at least some embodiments, a number of rounds awarded may be related to a number of trigger symbols, such as trigger symbols 530*a-c*, that are displayed in matrix 401. For example, if four trigger symbols are displayed, four rounds of play may be awarded, and so on.

Figure 6:
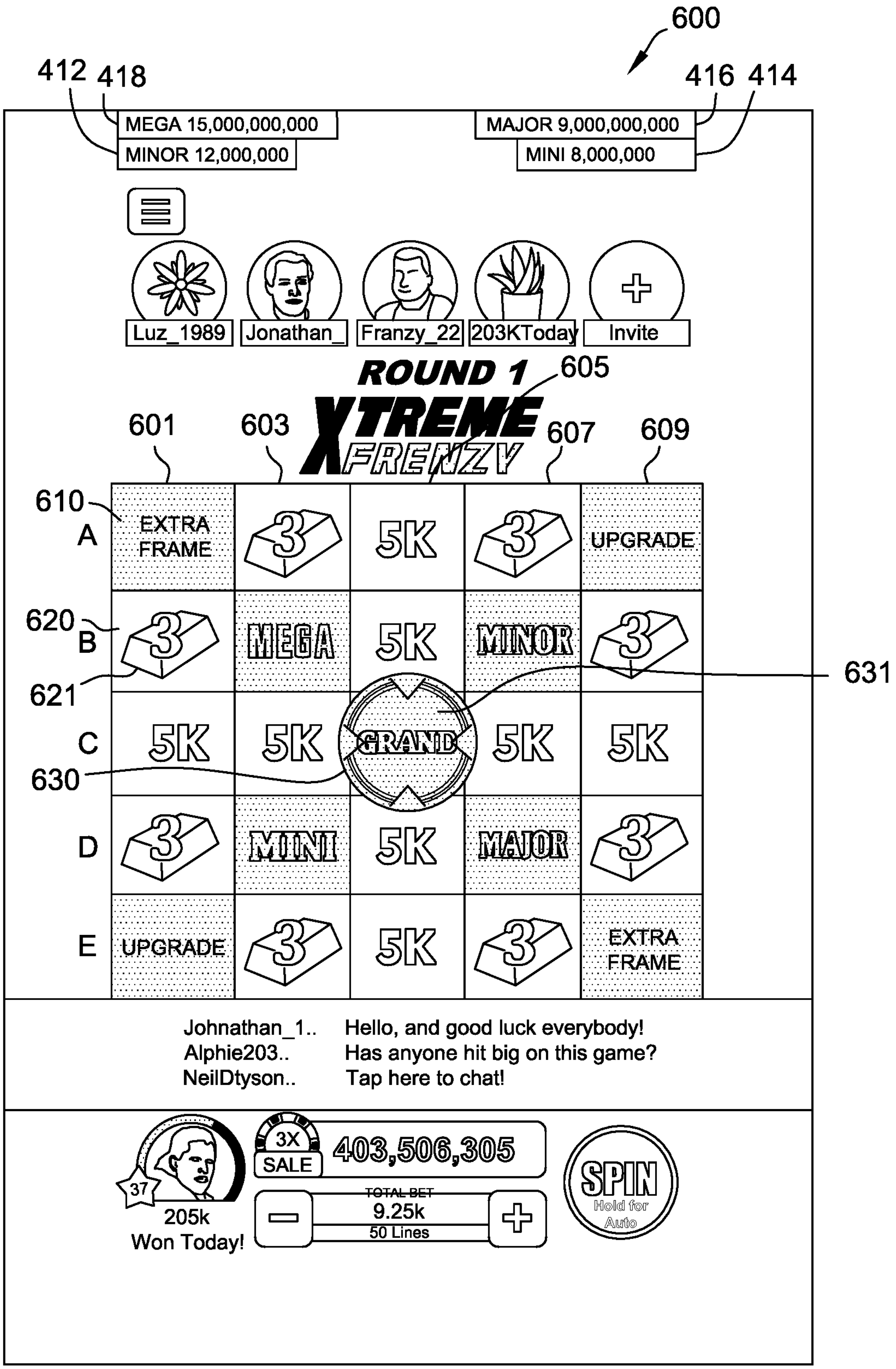
FIG. 6 is an example embodiment of a display area displayed during a feature game in accordance with the present disclosure, in which a first award is selected by a randomly traversing selection indicium.

FIG. 6 is an example embodiment of a display area 600 that may be displayed during play of the feature game (triggered as described above). In an example implementation, the game display 600 includes a five-by-five matrix 610 (or "award symbol display position matrix") of symbol display positions (or, as used herein, "award symbol display positions"), each of which may include a respective symbol, such as a respective award symbol and/or, as described herein, another type of (non-award) symbol. In the illustrated example, there are twenty-five award symbol display positions, such as award symbol display position 620, each, in at least some embodiments, displaying an award or prize, such as award 621.

As described in additional detail above, in at least some embodiments, the matrix 610 may be provided as a substitute for a larger game element, such as a wheel (not shown) and/or another game element that may typically be displayed by a full-size electronic gaming machine 104. For example, the matrix 610 of award symbol display positions may in at least one implementation be provided to a mobile computing device, such as a smartphone or tablet computing device, which may include a smaller display than, for example, a full-size electronic gaming machine 104. The matrix 610 may be more legible and/or include an easier to read visual presentation than a standard wheel (or other larger size game element), which may be divided into many sectors or segments and which may, when displayed compactly on a relatively small display of a mobile computing device, be difficult to read and/or otherwise suffer in terms of overall aesthetic and presentation.

Stated another way, at least one technical problem addressed by the present disclosure is that of providing an alternate version of a game, or feature game, when the game is to be played on a device having a smaller display and/or when displaying the full- or standard-size version of the game would impair the legibility and/or visual aesthetic of the game on a smaller display device. Moreover, as described herein, in at least some embodiments, a server system, such as casino management system server 114, may initially determine whether the game and/or feature game are to be played on an EGM 104 or a mobile computing device of a player. If the game and/or feature game are to be displayed by an EGM 104, the server 114 may provide and/or select a wheel-version of the game (not shown) that includes display elements sized and/or shaped for display by the larger EGM 104. On the other hand, if the server 114 determines that the game and/or feature game are to be played on a mobile computing device having a smaller display, the server 114 may provide and/or select a matrix-version of the game to improve the visual aesthetic of the game and/or feature game on the smaller display of the mobile computing device. The matrix-version of the game is described herein with reference to FIGS. 4-10. It should be appreciated, however, that in at least some embodiments, the matrices 401 and/or 610 may be replaced by a larger wheel in version of the game presented on an EGM 104. However, in some embodiments, the matrix-version of the game and feature game are also provided on an EGM 104. Stated another way, in at least some embodiments, server 114 may provide a selection between two versions to provide a version best suited for a given display size. However, because for example, the matrix-version described herein may also be quite popular on a larger display, in various embodiments, it may also be provided and played on an EGM 104.

Accordingly, in the example embodiment, display area 600 includes a plurality of columns 601-609 and a plurality of rows, labeled "A," "B," "C," "D," and "E." Together, columns 601-609 and rows "A-E" define matrix 610, which may as described herein, include the plurality of award symbol display positions, each, in at least some embodiments, associated with or including a respective award symbol. Thus, for example, award symbol 621 is displayed at award symbol display position 620, which is located in column 601, row "A" (or position "601-A"). Accordingly, matrix 610 may be similar to matrix 401 from the base game, except that each column 601-609 may not, during the feature game, be associated with a reel that spins and stops. Rather, the award symbols displayed within matrix 610 may be populated at the beginning of each round of play and selected, as described in additional detail herein. However, in other embodiments, columns 601-609 may include reels as well (as described elsewhere herein).

In the example embodiment, during the feature game, a selection indicium 630 may be displayed. As used herein, the selection indicium may be shaped, at least in part, like a reticle, a spyglass, and/or another suitable shape. In other embodiments, selection indicium 630 may be generally circular. In some embodiments, selection indicium 630 may include any other desired shape and/or artwork, and it will be appreciated that the shape and other visual aspects of selection indicium 630 may vary as desired and in accordance with the embodiments described herein.

Accordingly, during play of the feature game, selection indicium 630 may randomly traverse (e.g., travel, walk, step, translate, etc.) between award symbol display positions within matrix 610, such as from a starting award symbol display position to an ending award symbol display position. When selection indicium 630 lands on an award symbol display position, the award or prize included in the selected award symbol display position may be provided to the player, such as by adding the award to a credit balance of the player and/or, depending upon the nature of the award, as described herein, in any of a variety of other suitable ways.

In the example shown at FIG. 6, the selection indicium 630 may begin to traverse matrix 610 from any starting position (not shown) within matrix 610, such as a starting position selected by the player (e.g., using the touchscreen display 128) and/or from a randomly determined starting position. In addition, the ending position, such as in this example, award symbol display position 631, which may include an award, such as in this case, the "grand" award, which may be associated with a progressive jackpot 412-418 and/or another jackpot award, as described herein.

Moreover, in at least some embodiments, an algorithm may be provided that controls the motion of selection indicium 630 between a starting position and an ending position. For example, in some implementations, processor 204 may implement the algorithm to control selection indicium 630, such that selection indicium randomly travels from one award symbol display position within matrix 610 to an next adjacent award symbol display position, and so on, for any desired number of "steps" until selection indicium lands on the ending position, which may be predetermined and randomly selected, such as using RNG 212.

To illustrate, processor 204 and/or a processor of a mobile computing device (either or both referred to hereinafter for simplicity as "the processor") may implement the algorithm to determine a number of steps between the starting position and the ending position, such as for illustrative purposes only, five steps. The processor may, in response to determining the number of steps, control the display of selection indicium 630 within matrix 610, such that selection indicium 630 moves from the starting position (which may also be randomly determined) through four intermediate award symbol display positions within matrix 610, to a fifth award symbol display position, such as position 631 (i.e., the ending position).

In some embodiments, selection indicium 630 may traverse award symbol display positions one at a time, such as from one adjacent position to a next adjacent position in any desired direction, such as vertically, horizontally, and/or diagonally. In other embodiments, selection indicium 630 may traverse non-adjacent award positions, such as by "skipping" or "jumping" between non-adjacent positions. It will be thus be appreciated that the motion of selection indicium 630 may be variously controlled and that a variety of implementations are contemplated by and within the scope of the present disclosure. Likewise, in at least some embodiments, although five steps are described above, any suitable number of steps between a starting position and an ending position may be used, such as ten steps, twenty steps, and the like.

In some embodiments, the processor may determine the random path between the starting position and the ending position in segments or sections, such as for example, to alleviate processing and memory allocation requirements. For example, in a twenty-four step path, processor may determine the random path in three segments or sections, since in a five-by-five matrix, such as matrix 610, no award symbol position is greater than eight steps from any other award symbol position (e.g., the processor may break a twenty-four step path into three segments). However, it will be appreciated that different paths, having different numbers of steps, may be calculated in any suitable number of stages or segments, and that the example above is merely illustrative. It will also be appreciated that the segmented calculation is facilitated by the size of matrix 610 as well as determination of the starting and ending paths without the need to calculate, in a single processing cycle, the entire path between the starting and ending positions. In some embodiments, the processor may also calculate the random path, of any length, in a non-segmented or single calculation. In some embodiments, the processor may calculate a random travel path in segments or as a single extended path between the starting and ending positions to facilitate a smooth traversal by selection indicium 630 within matrix 610. For example, the processor may select a calculation technique, as described, to facilitate a smoothest or otherwise optimal graphical appearance of selection indicium 630 traversing matrix 610.

Moreover, in some embodiments, the processor may implement the algorithm to control or adjust a speed of selection indicium 630. For example, in at least one embodiment, the speed of selection indicium may decrease as selection indicum 630 traverses matrix 610. For example, in a twenty-step traversal of matrix 610, the first ten steps may proceed at a first rate, the next five steps may proceed at a second, slower rate, and the final five steps may proceed at a third, even slower, rate. However, these values are merely examples, and it will be appreciated that the speed of selection indicium 630 may be variously adjusted to increase player anticipation, excitement, and the like. Further, in at least one embodiment, the speed of award indicium 630 may be increased between the starting position and the ending position and/or, in some implementations, the speed of selection indicium 630 may remain substantially constant as selection indicium 630 traverses matrix 610.

In the example embodiment, the awards or prizes displayed within matrix 610 can include, but are not limited to: i) credit award prizes (e.g., matrix 610 may include award symbol display positions displaying credit award prizes, such as prizes of 5,000 credits); ii) secondary credit award prizes (e.g., matrix 610 may include award symbol display positions displaying "gold bar" secondary credit award prizes, which may for example be associated with a value of three secondary credits); iii) jackpot award prizes (e.g., matrix 610 may include award symbol display positions displaying mini, minor, major, mega and grand jackpot award prizes); iv) extra frame award prizes (e.g., matrix 610 may include award symbol display positions displaying extra frame award prizes, which may provide additional selection indicia 630, as described in additional detail below); v) upgrade award prizes (e.g., matrix 610 may include award symbol display positions displaying upgrade award prizes); vi) black-hole award prizes, which may as described herein, result in no award, termination of the feature game, and/or modification of selection indicium 630; vii) transport award prizes, as described herein; and/or viii) prize multiplier award prizes and additional play award prizes. Other award prizes are also contemplated by and within the scope of the present disclosure.

Figure 7:
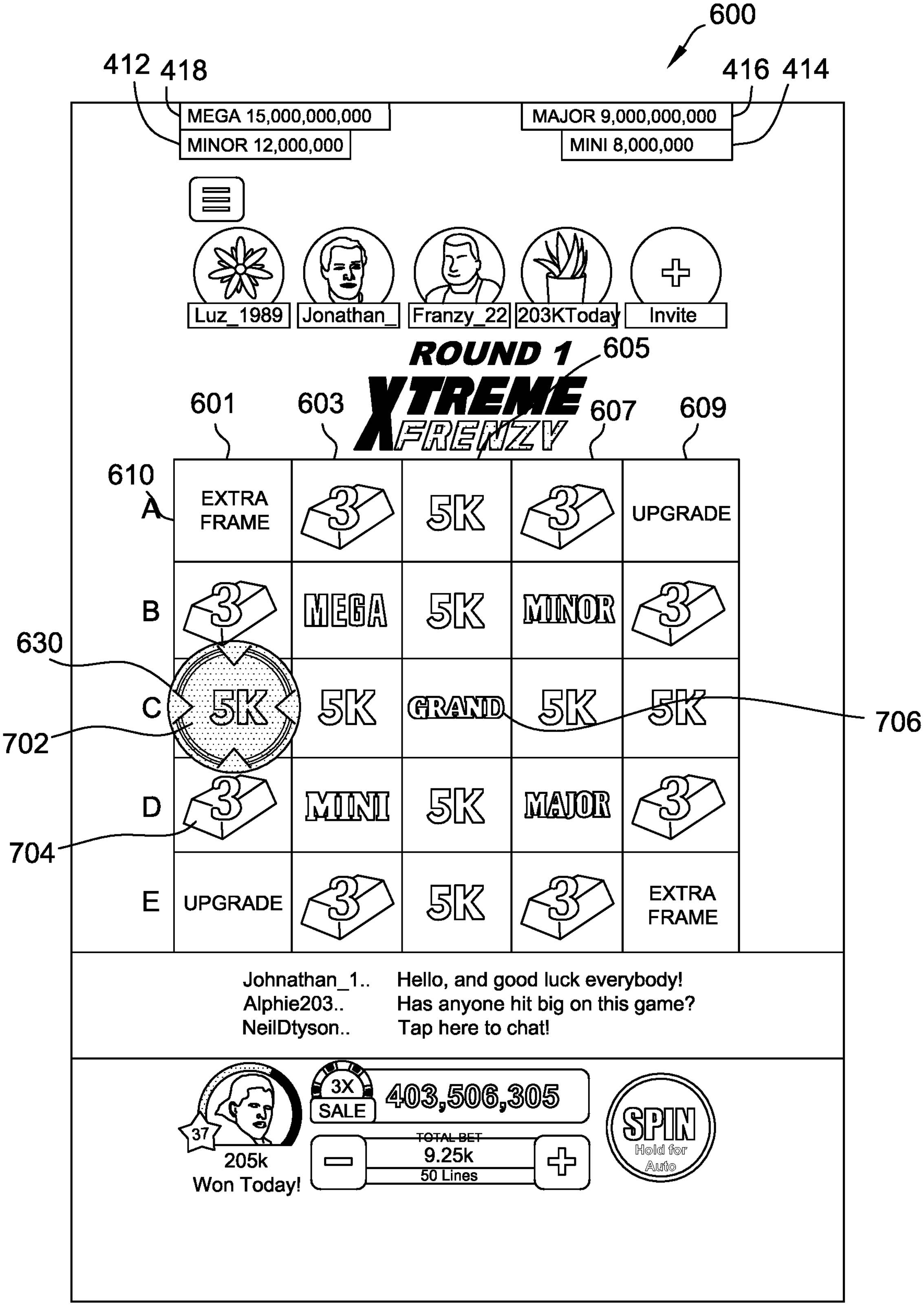
FIG. 7 is an example embodiment of a display area displayed during a feature game in accordance with the present disclosure, in which a second award is selected by a randomly traversing selection indicium.

FIG. 7 is an example embodiment of display area 600, in which selection indicium 630, after traversing award symbol display position matrix 610, has landed on an award symbol display position 702 at position 601-C, displaying a credit prize, such as a "5K" (5,000) credit prize. In response to selection indicium 630 landing display position 702, the credit prize displayed therein (e.g., 5,000 credits) is awarded to the player, such as by adding the credit prize to a credit balance of the player.

Likewise, as described above, when selection indicium 630 lands on an award symbol display position 620 displaying a secondary credit prize (e.g., a gold bar), such as the gold bar displayed at position 704 (position 601-D), the secondary credit prize is awarded to the player. In some embodiments, secondary credits may not represent monetary value, but rather, secondary credits, such as gold bars, may represent social media or group currency, which may be added to or displayed in association with a social media or group play experience. In at least one embodiment, for example, gold bars may be accumulated by a player and the aggregated value of gold bars displayed to other individuals as part of a social or group gaming experience. In some embodiments, secondary credit prizes may be associated with a monetary value as well and/or in the alternative, and the monetary value may be added to the player's credit balance.

In some embodiments, the credit prize amounts and/or secondary credit prize amounts displayed within matrix 610 may scale with the amount of the wager. For example, a 1.5×, 2×, 3×, multiplier may be applied to credit prizes as a wager amount increases. As a result, in some embodiments, players may control the multiplication or scaling factor by placing larger and/or smaller wagers.

In an example implementation, during play of a round of the feature game, when selection indicium 630 lands on an award symbol display position displaying a jackpot prize (e.g., the GRAND prize at position 706 (position 605-C), the jackpot prize credit amount corresponding to the jackpot prize displayed on the jackpot prize award symbol display position 706 is awarded to the player. In some embodiments, a jackpot prize can be a fixed jackpot award and/or can be a progressive jackpot award. In some examples, the amount of a jackpot prize can scale with an amount of a wager. Several jackpot prizes 412, 414, 416, and 418 are shown with reference to FIG. 4, and these may as described be provided to a player when selection indicium 630 lands on an award symbol display position designating the respective jackpot prize 412-418.

Figure 8:
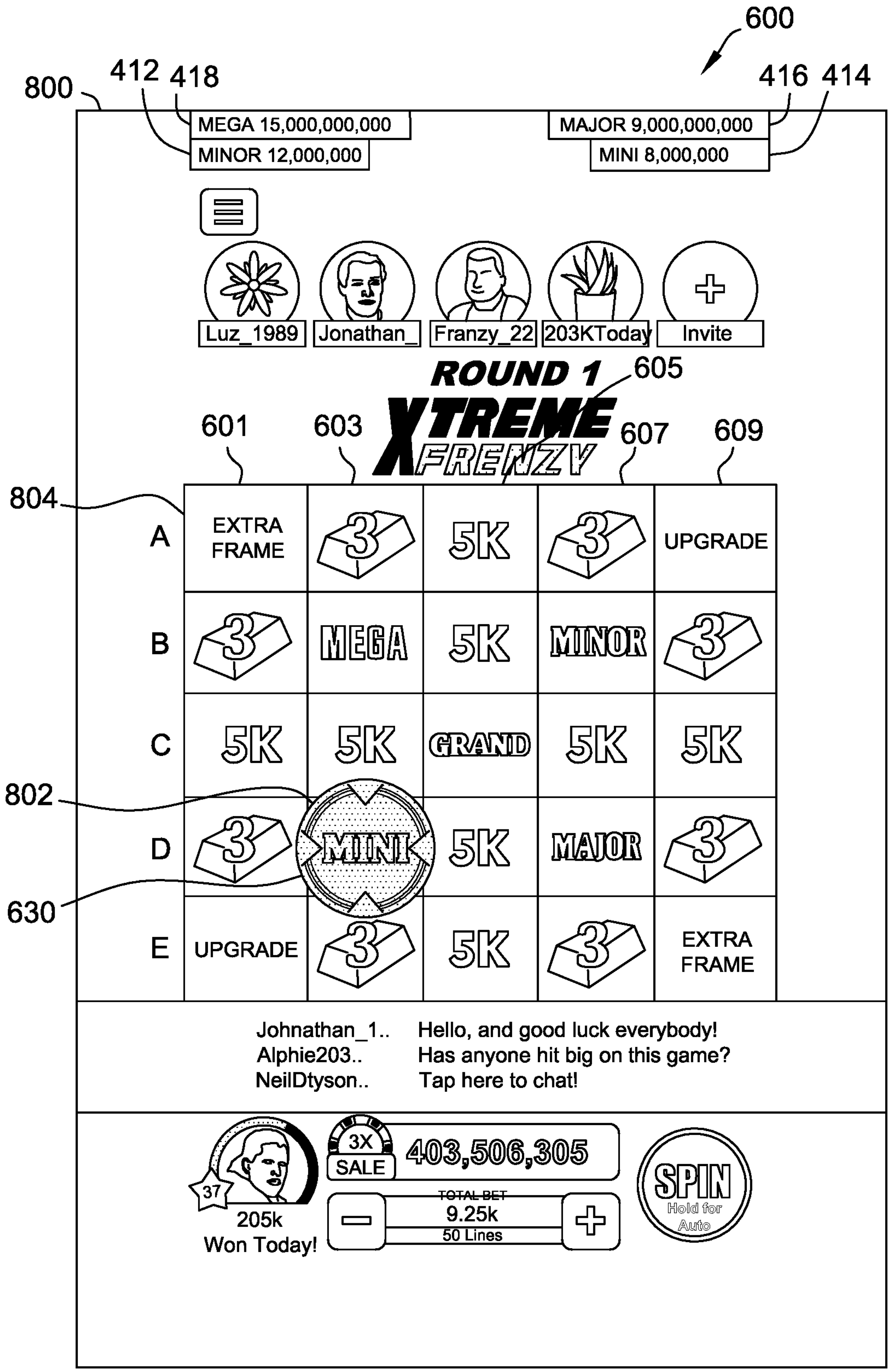
FIG. 8 is an example embodiment of a display area displayed during a feature game in accordance with the present disclosure, in which a third award is selected by a randomly traversing selection indicium.

FIG. 8 is another example embodiment of display area 600, in which selection indicium 630, after traversing award symbol display position matrix 610, has landed on an award symbol display position 802 (at position 603-D) displaying another jackpot prize, such as a MINI jackpot prize. As described herein, the jackpot prize amount corresponding to the MINI jackpot prize can be provided to the player (e.g., in the example shown, 8,000,000 credits).

Figure 9:
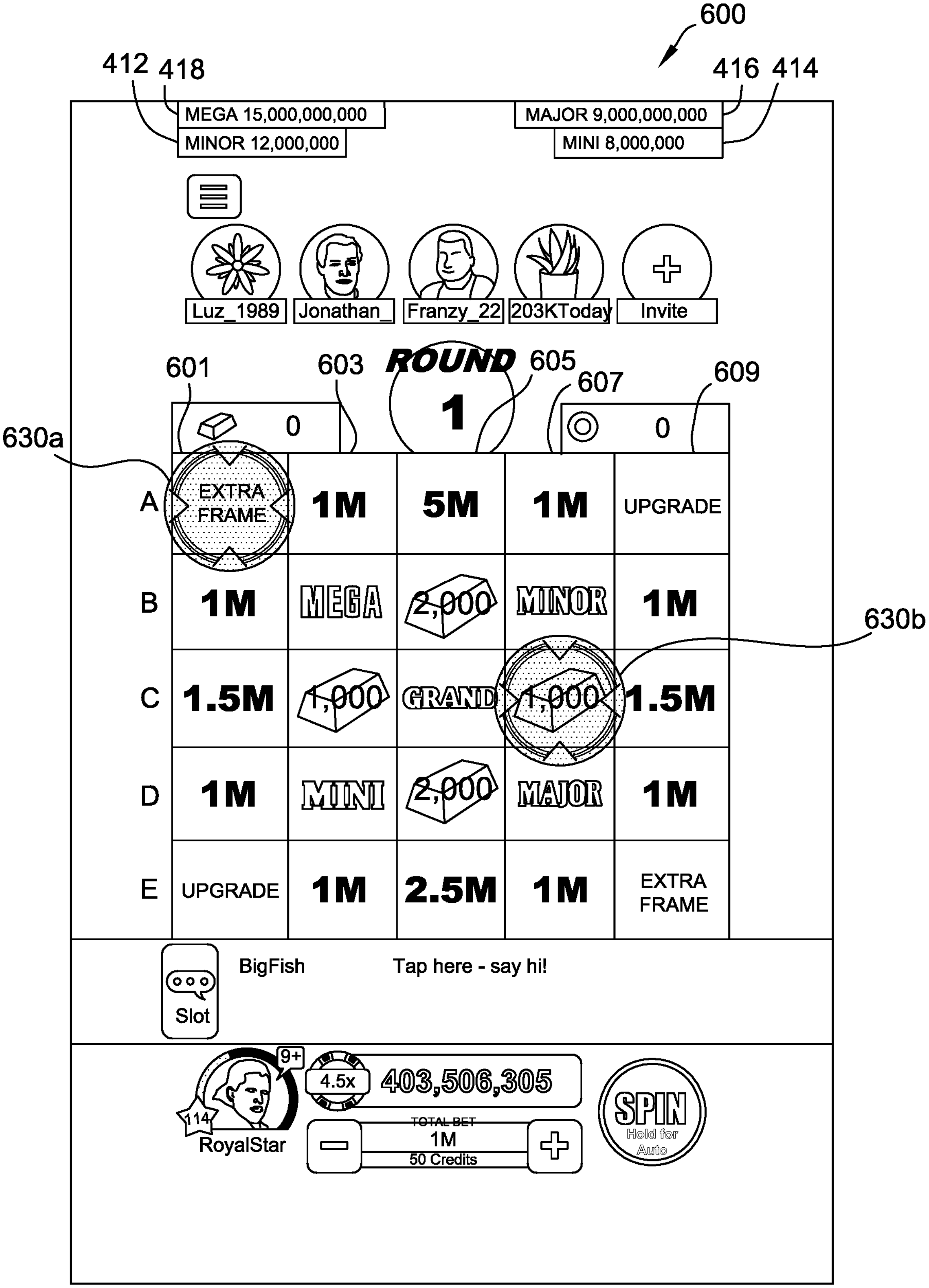
FIG. 9 is an example embodiment of a display area displayed during a feature game in accordance with the present disclosure, in which a first plurality of awards are selected by a plurality of randomly traversing selection indicia.
Figure 10:
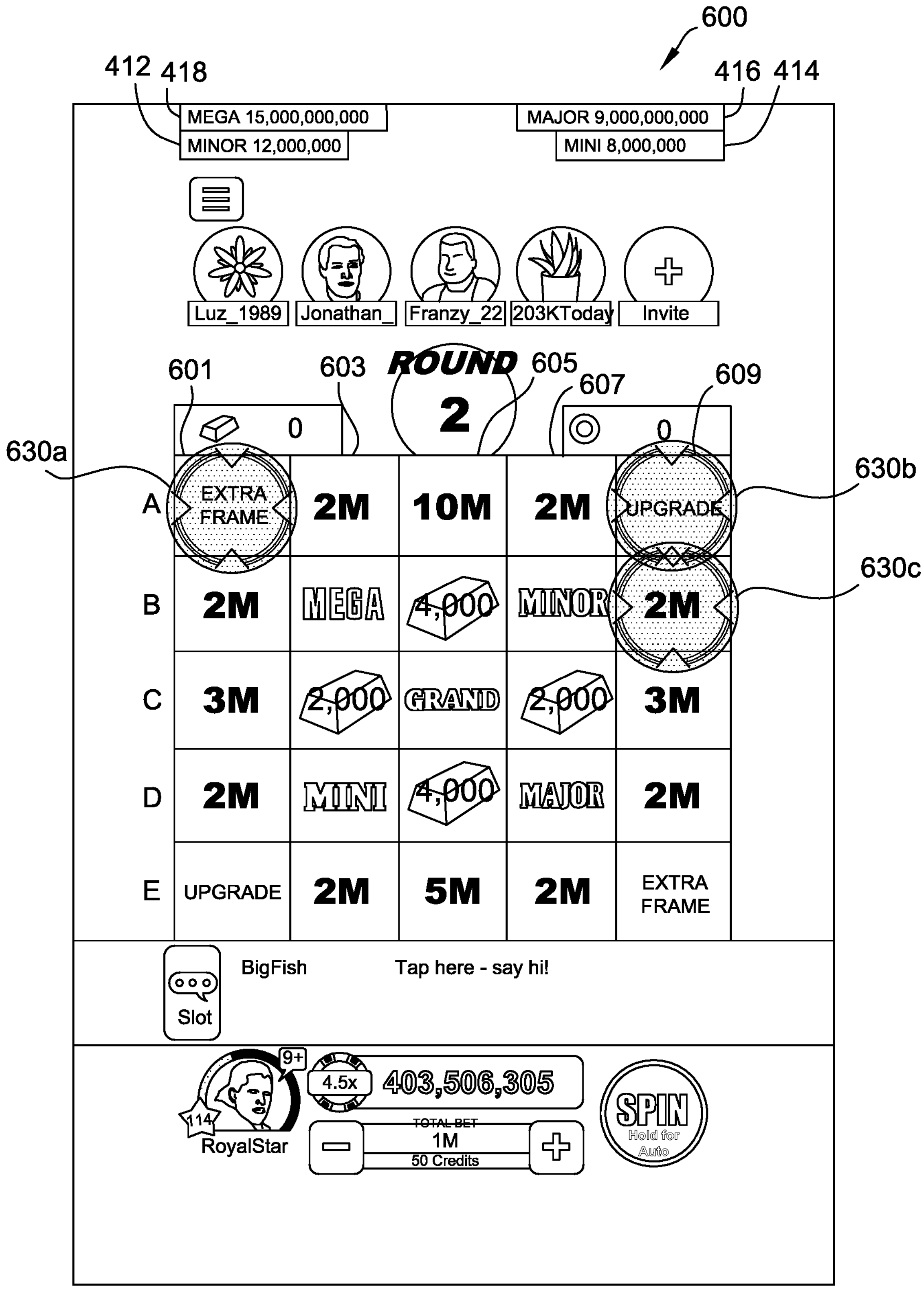
FIG. 10 is an example embodiment of a display area displayed during a feature game in accordance with the present disclosure, in which a second plurality of awards are selected by a plurality of randomly traversing selection indicia.

FIG. 9 is an example embodiment of display area 600, in which multiple awards may be selected by a plurality of randomly traversing selection indicia, such as first selection indicium 630*a* and second selection indicium 630*b*. In some embodiments, an additional selection indicium, such as indicium 630*b*, may be added in response to selection indicium 630 landing on an award symbol display position that includes an extra frame award symbol, such as position 804 at the location 601-A, as shown in FIG. 8. Stated another way, the "extra frame" symbol, when selected, may cause the processor to add indicium 630*b* to one or more subsequent rounds of play.

In some embodiments, if there are already two or more selection indicia 630*a* and 630*b* traversing matrix 610, if one selection indicium 630*a* or 630*b* lands on an "extra frame" symbol, an additional selection indicum (not shown) may be added to the current round of play as well. As described herein, in some implementations, selection indicium 630*a* and 630*b* may independently randomly traverse the award symbol display position matrix 610 and, upon landing on respective award symbol display positions within matrix 610, award the associated prizes. Greater than a single selection indicium 630 is therefore possible during a round of play. An example of three selection indicia 630*a*, 630*b*, and 630*c* traversing matrix 610 during a given round of play is illustrated with reference to FIG. 10.

In some embodiments, when two or more selection indicia 630*a-b* are traversing the award symbol display position matrix 610 and land on a common award symbol display position, the amount of the co-selected award symbol display position prize can be increased. For example, if two selection indicia 630*a-b* land on a common credit award symbol display position, the credit prize awarded to the player can be increased by a multiplier, such as a four times (4×) multiplier, of the common credit award symbol display position prize. More particularly, in at least one example, the amount of the common or co-selected credit award symbol display position prize may be awarded once for each selection indicium 630*a-b* landing on the common credit award symbol display position, and then the sum of the two awards may also be doubled as a bonus for the two selection indicia 630*a-b* landing on the common credit award symbol display position.

In some embodiments, when two or more selection indicia 630*a-b* are traversing the award symbol display position matrix 610 and land on a single, common, award symbol display position, one or more additional award symbol display positions adjacent the common or co-selected award symbol display position may merge with the common award symbol display position. For example, the common award symbol display position can merge with additional adjacent award symbol display positions to become a larger "merged" award symbol display position (such as a 1×2, 2×2, 3×3, etc. sized position), which may award the player the combination, sum, or product of the award prizes of the merged single and additional award symbol display positions.

In some embodiments, when two or more selection indicia 630*a-b* are traversing the award symbol display position matrix 610 and collide (e.g., "bump") into one another, they can bounce off of one another and, in some instances, one or more of the selection indicia 630*a-b* can be upgraded to provide an award enhancement, such as an award multiplier (e.g., a 2×, 4× or other multiplier), that can be applied to an award prize at the end of the round of play of the feature game, and/or at the end of the feature game.

In some embodiments, when two or more selection indicia 630*a-b* are traversing the award symbol display position matrix 610 and land in a predetermined pattern and or at predetermined locations on the award symbol display position matrix 610, another feature game can be awarded, such as for example, and without limitation, a wheel spin feature game or a hold-n-spin feature game. In some embodiments, a predetermined pattern can be two or more selection indicia 630*a-b* landing on adjacent award symbol display positions of the award symbol display position matrix 610, and/or three or more XF reticles 630 landing on horizontally, vertically, and/or diagonally aligned award symbol display positions 620. In some embodiments, predetermined locations can be one or more corner award symbol display positions (e.g., any of the positions at locations 601-A, 601-E, 609-A, and/or 609-E) of the award symbol display position matrix 610.

In some embodiments, when two or more selection indicia 630*a-b* are simultaneously traversing the award symbol display position matrix 610 and "bump" into one another (as described elsewhere herein), the two or more selection indicia 630*a-b* can merge or otherwise combine to become a larger award indicating indicium (e.g., a "super-indicium") (not shown). For example, two selection indicia 630*a-b* can become a larger, double-sized, indicium that can be twice the size of either individual selection indicia 630*a-b*. Likewise, three selection indicia 630*a-c* can become a triple-sized indicium that can be three-times the size of the an individual selection indicium 630*a-c*. The super-indicium can then land within matrix 610 covering or spanning a plurality of award symbol display positions and awarding the player the combination, sum, and/or product of the award symbol display position prizes the super-indicium is partially and/or entirely covering.

In some example implementations, the award symbol display position matrix 610 can include one or more "black-hole" award symbol display positions (not shown). As used herein, a black-hole award symbol display position may cause selection indicium 630 to be removed from matrix 610. For example, when two or more selection indicia 630*a-b* are traversing the award symbol display position matrix 610 during play of a round of the feature game and one of the selection indicia 630*a-b* traverses or lands on a black-hole award symbol display position, the selection indicia 630*a-b* may be removed from play of the current round of the feature game (and/or from all remaining rounds of play). In some embodiments, when selection indicium 630*a-b* traverses or lands on a black-hole award symbol display position and is removed from play of the round of the feature game, the black-hole award symbol display position may be transitioned or changed into another type of award symbol display position, such as a jackpot award symbol display position, as described elsewhere herein. Stated another way, when a selection indicia 630*a-b* is removed as a result of landing on a "black hole," in return for loss of the selection indicia 630*a-b*, the black hole may be changed into a symbol that, if selected again, provides an award to the player.

In some embodiments, if only one selection indicium 630 is traversing the award symbol display position matrix 610 and the selection indicium 630 traverses or lands on a black-hole award symbol display position, the selection indicium 630 may be removed from matrix 610, and the feature game may end (returning gameplay to the base game and/or providing an option to cash out of the game). In other embodiments, if, following removal of the one selection indicium 630 and end of the round of play of the feature game, there are additional rounds of play remaining in the feature game, a new Selection indicium 630 may be provided for a subsequent round of play of the feature game.

In some embodiments, if a "super-indicium" (as described above) traverses or lands on a black-hole award symbol display position, the super-indicium may also be removed from the feature game as previously described. In other embodiments, if super-indicium traverses or lands on a black-hole award symbol display position, the super-indicium may also be reduced to smaller or standard-sized indicium 630, such as from a triple-sized to a double-sized super indicium, or from a double-sized super indicium to a standard-sized indicium 630.

In some embodiments, the award symbol display position matrix 610 can include one or more "upgrade" award symbol display positions displaying an upgrade prize or upgrade award symbol. An upgrade award symbol is shown with reference to FIG. 6, for example, at location 609-A. In the example embodiment, if selection indicium 630 lands on such an upgrade award symbol, the player may be awarded an upgrade of the amount of the credit prize of each credit prize award symbol displayed within matrix 610. For example, one or more 5,000-credit prize award symbols can be upgraded to 10,000-credit prize award symbols, 3-credit secondary credit award symbol (e.g., gold bars, as described above) can be upgraded to 6-credit secondary credit award symbols, and so on.

In some embodiments, when selection indicium 630 lands on an upgrade award symbol, the player may be awarded an upgrade of some or all the jackpot awards, such as those at display positions 603-B, 607-B, 603-D, and/or 607-D. For example, a mini jackpot award can be upgraded to a minor jackpot award, a minor jackpot award can upgrade to a major jackpot award, etc. Similarly, in some embodiments, when selection indicium 630 lands on the upgrade award symbol, the player may be awarded an upgrade of the number of remaining rounds of play of the feature game, e.g., one or more additional play of the feature game can be awarded to the player. Likewise, in at least some embodiments, one or more "premium" award symbols may be included in matrix 610, and if selection indicium 630 lands on a premium award symbol, additional rounds of feature game play may be awarded. In at least one embodiment, premium award symbols may be included in response to a player wager that is greater than a threshold wager value.

In some embodiments, when selection indicium 630 lands on an upgrade award symbol display position, the number of rows (e.g., rows "A-E") and/or columns (e.g., columns 601-609) of the award symbol display position matrix 610 may be upgraded. For example, matrix 610 may be upgraded from a five row by five column matrix 610 to include one or more additional rows and/or one or more additional columns, whereby the upgraded award symbol display position matrix 610 may be upgraded to provide the player additional award symbol display positions, and prizes, which the selection indicium 630 may traverse.

In some instances, an upgrade of the number of rows and/or columns of the award symbol display position matrix 610 can be temporary or temporal. For example, the upgrade of the number of rows and/or columns can persist for a random or predetermined number of rounds of play of the feature game (e.g., one, two, three, or more plays of the feature game), or for a random or predetermined time (e.g., one, two, three or more seconds, one, two, three, or more minutes, and the like). In some instances, an upgrade of rows and/or columns of the feature game can persist for any remaining rounds of play of the feature game.

In some embodiments, the feature game award symbol display position matrix 610 can include one or more “transport” award symbols (not shown). In at least one embodiment, when a transport award symbol is selected by selection indicium 630, selection indicium 630 may be transported or moved (e.g., without intermediate steps, as described above) from the symbol display position of the transport award symbol within matrix 610 to another symbol display position within matrix 610, such as another adjacent and/or non-adjacent symbol display position within matrix 610. In some embodiments, a transported selection indicium 630 may land on the award symbol display position to which it has been transported and award the corresponding award symbol display position prize to the player. In some instances, a transported selection indicium 630 will continue to traverse the award symbol display position matrix 610 when it arrives at the award symbol display position to which it has been transported.

In some embodiments, a player can appear to influence a selection indicium 630 traversal path along the award symbol display positions. For example, the player can tilt a portable or mobile device, or the player can gesture (e.g., swipe) across a touch screen interface of the EGM 104 and/or mobile device to influence the direction of travel of the selection indicium 630.

In some instances, the player can appear to influence the path a selection indicium 630 traverses using virtual “handles” provided on feature game user interface, such as for example, using a display device touch screen interface. In at least some embodiments, the player can “grab” a handle by touching the location of the handle on the touch screen interface and “move” the feature game handle by dragging a finger in the direction the player wishes to move the feature game, such as, for example, the award symbol display position matrix 610. In at least some embodiments, the player can grab a handle provided in a corner of the award symbol display position matrix 610, and the player can lift or move the corner of the matrix 610 “upward” by dragging a finger in a first direction on the touch screen interface, and press or move the corner of the matrix 610 “downward” by dragging a finger in a second direction, e.g., in a direction opposite the first direction, on the touch screen interface.

In some instances, the feature game can be a labyrinth type game allowing the player to attempt to influence the traversal of selection indicium 630 within the labyrinth to avoid crossing or landing on undesirable award symbol display positions and to traverse or land upon desirable award symbol display positions (e.g., to attempt to maximize a credit prize award of the feature game). In some embodiments, the further a player influences selection indicium 630 traversal through the labyrinth, the more desirable the award symbol display position prizes may become. For example, one or more jackpot award symbols can be positioned in the labyrinth in increasing prize value (e.g., mini, minor, major, etc.) along the path through the labyrinth with the most desirable jackpot award symbol (e.g., grand) positioned furthest along the labyrinth path.

In some instances, the feature game award symbol display position matrix 610 can include one or more slot game reel award symbols. For example, a reel may spin and stop in one or more columns 601-609 to display a slot game reel award symbol and/or prize. The reels can spin in advance of, during, and/or following the traversal and landing of selection indicium 630. The player, upon the landing of selection indicium 630 on a slot game reel award symbol may be awarded the displayed slot game reel award.

In some embodiments, the feature game can be a multiplayer feature game wherein two or more players may participate competitively or collaboratively for award symbol display position prizes. Further, in one example of a multiplayer feature game, each player can have one or more selection indicium 630 traversing a common feature game award symbol display position matrix 610. A player’s selection indicium 630 can traverse autonomously. For example, the feature game can control selection indicium 630 traversal. Likewise, in some embodiments, the player can influence selection indicium 630 traversal by any of the methods described herein (e.g., using a touchscreen, using “handles,” and the like).

In some instances, a feature game can provide a user interface allowing a player to “launch” selection indicium 630 from a starting location into traversal on the award symbol display position matrix 610. Further, the feature game can provide selection indicium 630 in a launch starting location of the feature game award symbol display position matrix 610 and the player, such as using the touch screen interface, can touch selection indicium 630 and trace or draw (e.g., “drag”) selection indicium 630 within matrix 610. For example, the player may drag selection indicium in a downward direction a certain distance with a downward sliding gesture to simulate a spring-loading effect on selection indicium 630, and remove their finger (or other touch) to release selection indicium 630 into traversal at a direction opposite the gesture and at a fixed rate, or at a rate proportional to the draw down distance of the downward gesture. Additionally, or alternatively, the player can use the touch screen interface to “flick”, e.g., with a touch and sliding gesture, selection indicium 630 into traversal.

In some instances, the feature game award symbol display position matrix 610 can comprise one or more “flippers” at locations proximate one or more award symbol display positions. A flipper can be rotatable about a pivot end of the flipper and can be operatively connected to a touch screen interface “button” which, when pressed, actuates the flipper. Stated another way, flippers may include virtual flippers rendered on or near matrix 610 and/or mechanical flippers, which when actuated, may affect traversal by selection indicium 630. Accordingly, in various embodiments, a flipper can be actuated using a touch screen interface gesture and/or another mechanical or software interface.

In some embodiments, using the touch screen interface, a player can influence the traversal of selection indicium 630 along the award symbol display positions within matrix 610. Further, in some embodiments, when selection indicium 630 traverses within range of a flipper a player can actuate the flipper to make contact with (e.g., “strike”) selection indicium 630, and influence a change in selection indicium 630 traversal proportional to or otherwise based upon the strike of the flipper.

In some embodiments, the feature game award symbol display position matrix 610 can provide one or more flippers in a location proximate an award symbol display position, allowing the player, by actuating a flipper, to influence selection indicium 630 to traverse toward a desirable award symbol display position, e.g., a jackpot award symbol display position, or away from a non-desirable award symbol display position, such as a black-hole award symbol display position.

In some embodiments, a player may use a wearable smart device (e.g., a smart watch, such as an Apple Watch, a Samsung Galaxy Watch, and the like) to influence the traversal of selection indicium 630 on the award symbol display position matrix 610. For example, a wearable smart device may wirelessly communicate (e.g. via Bluetooth, NFC, Wi-Fi, etc.) with an EGM 104 and allow the player to, using the wearable smart device as an extension of the EGM game user interface, launch and release selection indicium 630, actuate one or more flippers to influence (e.g., "flip") selection indicium, "grab" a handle to lift or move a corner of the award symbol display position matrix 610, or otherwise interface with the EGM 104 game to influence the traversal of selection indicium (e.g., using any or all of the methods described herein).

In some embodiments, the feature game award symbol display position matrix 610 can include one or more "bounce posts" at predetermined or random locations proximate one or more award symbol display positions within matrix 610. Selection indicium 630, traversing in a direction toward a bounce post, can carom or bounce off a bounce post in a direction influenced by the direction of traversal at which selection indicium 630 strikes the bounce post. In some embodiments, one or more bounce posts can be located proximate a desirable or a non-desirable symbol (e.g., a jackpot award symbol or a black-hole award symbol), thereby decreasing the probability of selection indicium 630 traversing across or landing on the desirable or non-desirable award symbol display position.

In some embodiments, the total credit prize outcome of the feature game (e.g., the sum of the credit prize outcome of each round of play of the feature game) can be predetermined by a single randomly determined prize outcome at the start of the feature game. For example, the outcome of the feature game can be determined by a single RNG 212 call. Alternatively, the total credit prize outcome of the feature game can be the sum of a randomly determined prize outcome of each round of play of the feature game. For example, the outcome of each round of play of the feature game may be determined by an RNG 212 outcome, and the outcome of the feature game may be the sum of the feature game play outcomes.

In some embodiments, the secondary credit prize values (e.g., "gold bars," as described herein) can be a component of the total return to player (RTP) of the game. For example, the total RTP of the game can include the credit prize awards, the jackpot prize awards, and the secondary credit prize awards. In some embodiments, the secondary credit prize values can contribute to approximately 2% of the total RTP of the game. In other embodiments, the secondary credit prize values may contribute more or less than 2% to the total RTP of the game as well.

Figure 11:
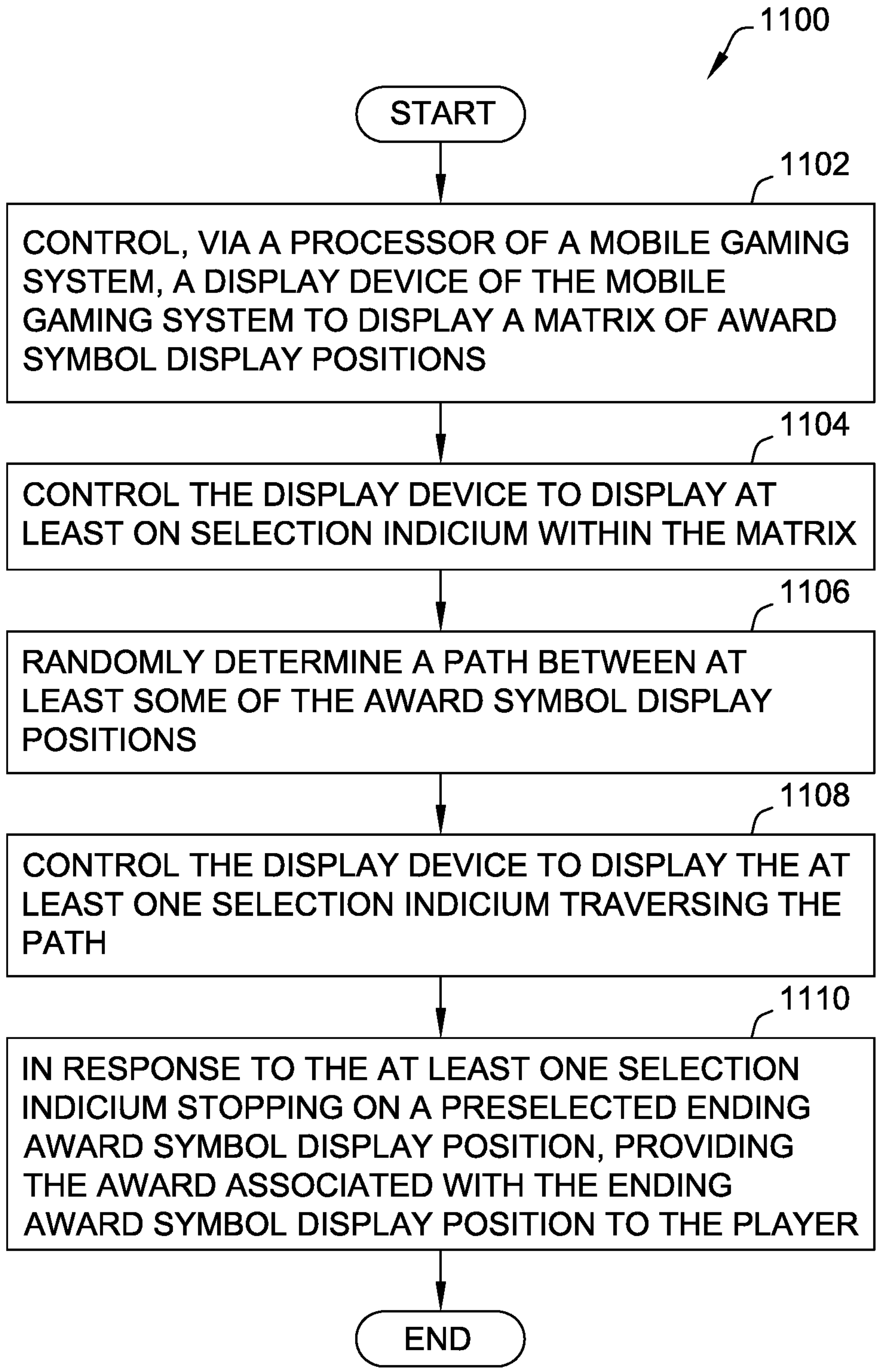
FIG. 11 is flowchart illustrating an example embodiment of a process for electronic gaming, in which a selection indicium randomly traverses a matrix of award symbol display positions.

FIG. 11 is flowchart illustrating an example embodiment of a process for electronic gaming, in which selection indicium 630 randomly traverses matrix 610 of award symbol display positions. In the example embodiment, and as described elsewhere herein, a display device 128 of an electronic gaming machine 104 and/or a display device of a mobile gaming device (e.g., a smartphone and/or tablet computing device) may be controlled, such as by a processor 204 of an electronic gaming machine 104 and/or by a processor of the mobile gaming device, to display matrix 610 of award symbol display positions, such as during a feature game, as described herein (step 1102). In at least some embodiments, a software application (or "app") installed and running on the mobile gaming device may perform process 111, such as via at least one processor of the mobile gaming device. In some embodiments, process 1100 may be implemented on an EGM 104, and the process steps described herein may be performed by processor 204 thereof.

Accordingly, in the example embodiment, the display device may also be controlled to display at least one selection indicium 630 within matrix 610 (step 1104). In addition, a path between at least some of the award symbol display positions, such as between a starting position and an ending position, may be randomly determined (step 1106). In the example embodiment, the display device may be controlled to display the at least one selection indicium 630 traversing or moving along the randomly determined path (step 1108). In response to the at least one selection indicium 630 stopping on a preselected ending award symbol display position, the award associated with the position identified by the selection indicium 630 may be provided to the player, such as by adding a value of the award to the player's credit balance (step 1110).

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. An electronic gaming device comprising:
- at least one memory device with instructions stored thereon; and
- at least one processor in communication with the at least one memory device, wherein the instructions, when executed by the at least one processor, cause the at least one processor to:
  - randomly determine a first segment of a travel path for a selection indicium between a starting symbol position and an intermediate symbol position;
  - randomly determine a second segment of the travel path for the selection indicium between the intermediate symbol position and an ending symbol position;
  - cause display of the selection indicium traversing the travel path on a display device of the electronic gaming device for an electronic game; and
  - provide an output for the electronic game, wherein the output is associated with the ending symbol position, and wherein the output comprises an additional selection indicium to be displayed for a next play of the electronic game.

2. The electronic gaming device of claim 1, wherein the instructions further cause the at least one processor to provide the output, wherein the output comprises an additional selection indicium to be displayed for a next play of the electronic game.

3. The electronic gaming device of claim 1, wherein the instructions further cause the at least one processor to cause display of the selection indicium and the additional selection indicium during the next play of the electronic game, wherein the selection indicium and the additional selection indicium traverse respective randomly determined travel paths during the next play of the electronic game.

4. The electronic gaming device of claim 1, wherein the instructions further cause the at least one processor to present the output, wherein the output comprises at least one upgrade to at least one potential output displayed on the display device for the next play of the electronic game.

5. The electronic gaming device of claim 1, wherein the instructions further cause the at least one processor to provide the output, wherein the output comprises at least one of causing display of an output amount or adding the output amount to a player account.

6. The electronic gaming device of claim 1, wherein the instructions further cause the at least one processor to cause display of the selection indicium traversing the travel path at varying speeds.

7. The electronic gaming device of claim 1, wherein the instructions further cause the at least one processor to:
receive a message associated with a game outcome for the electronic game from a server; and
provide the output based on the game outcome associated with the message.

8. The electronic gaming device of claim 1, wherein the instructions further cause the at least one processor to:
receive a message associated with the travel path from a server; and
randomly determine at least one of the first segment or the second segment based on the message.

9. The electronic gaming device of claim 1, wherein the instructions further cause the at least one processor to identify the starting symbol position for the selection indicium based on a message received from a server.

10. At least one non-transitory computer-readable storage medium with instructions stored thereon that, in response to execution by at least one processor, cause the at least one processor to:
randomly determine a first segment of a travel path for a selection indicium between a starting symbol position and an intermediate symbol position;
randomly determine a second segment of the travel path for the selection indicium between the intermediate symbol position and an ending symbol position;
cause the selection indicium to be displayed as traversing the travel path on a display device of an electronic gaming device for an electronic game; and
cause an output to be provided for the electronic game, wherein the output is associated with the ending symbol position, and wherein the output comprises an additional selection indicium to be displayed for a next play of the electronic game.

11. The at least one non-transitory computer-readable storage medium of claim 10, wherein the instructions further cause the at least one processor to cause the output to be provided, wherein the output comprises an additional selection indicium to be displayed for a next play of the electronic game.

12. The at least one non-transitory computer-readable storage medium of claim 10, wherein the instructions further cause the at least one processor to cause the selection indicium and the additional selection indicium to be displayed during the next play of the electronic game, wherein the selection indicium and the additional selection indicium traverse respective randomly determined travel paths during the next play of the electronic game.

13. The at least one non-transitory computer-readable storage medium of claim 10, wherein the instructions further cause the at least one processor to cause the output to be provided, wherein the output comprises at least one upgrade to at least one potential output displayed on the display device for the next play of the electronic game.

14. The at least one non-transitory computer-readable storage medium of claim 10, wherein the instructions further cause the at least one processor to cause the output to be provided, wherein the output comprises at least one of causing an output amount to be displayed or adding the output amount to a player account.

15. The at least one non-transitory computer-readable storage medium of claim 10, wherein the instructions further cause the at least one processor to cause the selection indicium to be displayed as traversing the travel path at varying speeds.

16. The at least one non-transitory computer-readable storage medium of claim 10, wherein the instructions further cause the at least one processor to:
determine a game outcome for the electronic game; and
transmit at least one message associated with the game outcome to the electronic gaming device, wherein receipt of the at least one message causes the electronic gaming device to provide the output.

17. The at least one non-transitory computer-readable storage medium of claim 10, wherein the instructions further cause the at least one processor to cause the selection indicium to be displayed as traversing the travel path on the display device by transmitting at least one message associated with at least one of the travel path or the output to the electronic gaming device displaying the electronic game.

18. A method of electronic gaming implemented by at least one processor in communication with at least one memory, the method comprising:
randomly determining a first segment of a travel path for a selection indicium between a starting symbol position and an intermediate symbol position;
randomly determining a second segment of the travel path for the selection indicium between the intermediate symbol position and an ending symbol position;
causing the selection indicium to be displayed as traversing the travel path on a display device of an electronic gaming device for an electronic game; and
causing an output to be presented for the electronic game, wherein the output is associated with the ending symbol position, and wherein the output comprises an additional selection indicium to be displayed for a next play of the electronic game.

19. The method of claim 18, further comprising:
determining a game outcome for the electronic game; and
transmitting at least one message associated with the game outcome to the electronic gaming device, wherein receipt of the at least one message causes the electronic gaming device to provide the output.

20. The method of claim 18, further comprising causing the selection indicium to be displayed as traversing the travel path on the display device by transmitting at least one message associated with at least one of the travel path or the output to the electronic gaming device displaying the electronic game.

* * * * *